(12) United States Patent
Yen et al.

(10) Patent No.: US 12,722,451 B1
(45) Date of Patent: Sep. 1, 2026

(54) INTELLIGENT VEHICLE CLIMATE CONTROL SETTINGS

(71) Applicant: GM Global Technology Operations LLC, Detroit, MI (US)

(72) Inventors: Chih-Hung Yen, Bloomfield Hills, MI (US); Vishal Raul, Northville, MI (US); Daniel Robert Tylutki, Livonia, MI (US); Scott E. Parrish, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/066,849

(22) Filed: Feb. 28, 2025

(51) Int. Cl.
*B60H 1/00* (2006.01)

(52) U.S. Cl.
CPC ....... *B60H 1/00742* (2013.01); *B60H 1/0073* (2019.05)

(58) Field of Classification Search
CPC .......................... B60H 1/00742; B60H 1/0073
See application file for complete search history.

(56) References Cited

U.S. PATENT DOCUMENTS 11,472,258 B2 * 10/2022 Han .................. B60H 1/00742
2018/0024725 A1 * 1/2018 Penilla ............... G06F 3/04842 701/49
2021/0024078 A1 * 1/2021 Dede .................... A61B 5/0002
2021/0031786 A1 * 2/2021 Gallagher .......... A61B 5/02055
2021/0114433 A1 * 4/2021 Neveu ................ B60H 1/00742
2021/0291619 A1 * 9/2021 Aghniaey .......... B60H 1/00657
2022/0219506 A1 * 7/2022 Han ..................... B60H 1/0073
2025/0026168 A1 * 1/2025 Gilbert-Eyres .... B60H 1/00021

* cited by examiner

*Primary Examiner* — Frederick M Brushaber
(74) *Attorney, Agent, or Firm* — Vivacqua Crane, PLLC

(57) ABSTRACT

A system for individually controlling heat, ventilation and air conditioning (HVAC) settings for each of a plurality of seating positions within a vehicle includes a system controller in communication with a plurality of onboard sensors within the vehicle, the plurality of onboard sensors adapted to detect a presence of a passenger within a one of the plurality of seating positions, collect real-time data related to environmental factors for the seating position, external factors for the seating position and biometric parameters for the passenger, the system controller adapted to, for each one of the plurality of seating positions where a passenger is detected, receive data related to environmental factors, external factors and biometric parameters, predict desired HVAC settings and automatically adjust HVAC settings for the seating position to the predicted desired HVAC settings.

20 Claims, 5 Drawing Sheets

INTELLIGENT VEHICLE CLIMATE CONTROL SETTINGS

INTRODUCTION

The present disclosure relates to a system and method for independently controlling heat ventilation and air conditioning (HVAC) settings for a plurality of seating positions within a vehicle.

Current HVAC systems within vehicle are capable of allowing passengers seated within a seating position to customize the HVAC settings to their personal preferences, creating a personalized climate zone. Existing systems rely on each passenger manually adjusting HVAC settings for the seating position within which they are seated.

Thus, while current systems and methods achieve their intended purpose, there is a need for a new and improved system and method for automatically adjusting HVAC settings for a seating position to predicted desired HVAC settings for a passenger seated therein based on environmental factors, external factors, and biometric parameters.

SUMMARY

According to several aspects of the present disclosure, a method of individually controlling heat, ventilation and air conditioning (HVAC) settings for each of a plurality of seating positions within a vehicle, includes, for each one of the plurality of seating positions, detecting, with a plurality of onboard sensors within the vehicle and in communication with a system controller, a presence of a passenger within the seating position, collecting, with a plurality of onboard sensors in communication with a system controller, real-time data related to environmental factors for the seating position, collecting, with the plurality of onboard sensors, real-time data related to external factors for the seating position, collecting, with the plurality of onboard sensors, real-time data related to biometric parameters for the passenger, predicting, with the system controller, desired HVAC settings for the passenger located within the seating position based on the external factors for the seating position, the environmental factors for the seating position and the biometric parameters for the passenger, and automatically, with the system controller, adjusting HVAC settings for the seating position to the predicted desired HVAC settings.

According to another aspect, the predicting, with the system controller, desired HVAC settings for the passenger located within the seating position based on the external factors for the seating position, the environmental factors for the seating position and the biometric parameters for the passenger further includes accessing, with the system controller, a machine learning model for the seating position based on data collected from past instances of occupants being seated within the seating position, and probabilistically predicting, with the machine learning model for the seating position, desired HVAC settings for the passenger within the seating position based on the real-time data related to environmental factors for the seating position, external factors for the seating position, and biometric parameters for the passenger.

According to another aspect, the predicting, with the system controller, desired HVAC settings for the passenger located within the seating position based on the external factors for the seating position, the environmental factors for the seating position and the biometric parameters for the passenger further includes accessing, with the system controller, a machine learning model for the passenger based on data collected from past instances of the passenger being seated within the seating position, and probabilistically predicting, with the machine learning model for the passenger, desired HVAC settings for the passenger within the seating position based on the real-time data related to environmental factors for the seating position, external factors for the seating position, and biometric parameters for the passenger.

According to another aspect, the collecting, with the plurality of onboard sensors in communication with the system controller, real-time data related to environmental factors for the seating position includes collecting, with the plurality of onboard sensors, real-time data related to at least weather conditions, date (season), location, temperature, day/night, and solar loading.

According to another aspect, the collecting, with the plurality of onboard sensors, real-time data related to external factors for the seating position includes collecting, with the plurality of onboard sensors, real-time data related to at least a type of clothing being worn by the passenger, number of other passengers within the vehicle and predicted desired HVAC settings for other ones of the plurality of seating positions within the vehicle.

According to another aspect, the collecting, with the plurality of onboard sensors, real-time data related to biometric parameters for the passenger includes collecting, with the plurality of onboard sensors, real-time data related to at least gender, height, and weight of the passenger, and position of the head and body of the passenger.

According to another aspect, the collecting, with the plurality of onboard sensors, real-time data related to biometric parameters for the passenger includes collecting, with the plurality of onboard sensors, real-time data related to physiological signals from the passenger.

According to another aspect, the predicting, with the system controller, desired HVAC settings for the passenger located within the seating position based on the external factors for the seating position, the environmental factors for the seating position and the biometric parameters for the passenger includes predicting desired HVAC settings for different body portions of the passenger.

According to another aspect, the automatically, with the system controller, adjusting HVAC settings for the seating position to the predicted desired HVAC settings includes at least adjusting direction of vents, adjusting discharge air temperature, adjusting discharge air mass flow rate, and actuating shading devices.

According to another aspect, the method further includes continuously collecting, with the plurality of onboard sensors, data related to a reaction, by the passenger, to current predicted desired HVAC settings, and automatically adjusting the predicted desired HVAC settings based on the data related to the reaction by the passenger.

According to another aspect, the method further includes updating the machine learning model for the seating position and the machine learning model for the passenger based on adjustments made to the predicted desired HVAC settings and the external factors for the seating position, the environmental factors for the seating position and the biometric parameters for the passenger when such adjustments are made.

According to another aspect, the continuously collecting, with the plurality of onboard sensors, data related to a reaction, by the passenger, to current predicted desired HVAC settings includes monitoring, with a driver monitoring system and the plurality of onboard sensors, head movements and hand gestures by the passenger, receiving, via a microphone, verbal feedback from the passenger, monitoring, with the plurality of onboard sensors, changes in the external factors for the seating position and the biometric parameters for the passenger, and receiving, via a human machine interface (HMI), manual adjustments, by the passenger, to the HVAC settings.

According to several aspects of the present disclosure, a system for individually controlling heat, ventilation and air conditioning (HVAC) settings for each of a plurality of seating positions within a vehicle includes a system controller in communication with a plurality of onboard sensors within the vehicle, the plurality of onboard sensors adapted to detect a presence of a passenger within a one of the plurality of seating positions, collect real-time data related to environmental factors for the seating position, collect real-time data related to external factors for the seating position, and collect real-time data related to biometric parameters for the passenger, the system controller adapted to, for each one of the plurality of seating positions where a passenger is detected, receive, from the plurality of sensors, data related to the detection of a passenger within the seating position, environmental factors and external factors for the seating position and biometric parameters for the passenger within the seating position, predict desired HVAC settings for the passenger located within the seating position based on the external factors for the seating position, the environmental factors for the seating position and the biometric parameters for the passenger, and automatically adjust HVAC settings for the seating position to the predicted desired HVAC settings, wherein, the system controller is adapted to at least adjust direction of vents, adjust discharge air temperature, adjust discharge air mass flow rate, and actuate shading devices.

According to another aspect, when predicting desired HVAC settings for the passenger located within the seating position based on the external factors for the seating position, the environmental factors for the seating position and the biometric parameters for the passenger, the system controller is further adapted to access a machine learning model for the seating position based on data collected from past instances of occupants being seated within the seating position, access a machine learning model for the passenger based on data collected from past instances of the passenger being seated within the seating position, and probabilistically predict, with the machine learning model for the seating position and the machine learning model for the passenger, desired HVAC settings for the passenger within the seating position based on the real-time data related to environmental factors for the seating position, external factors for the seating position, and biometric parameters for the passenger.

According to another aspect, the real-time data related to environmental factors for the seating position includes real-time data related to at least weather conditions, date (season), location, temperature, day/night, and solar loading, the real-time data related to external factors for the seating position includes real-time data related to at least a type of clothing being worn by the passenger, number of other passengers within the vehicle and predicted desired HVAC settings for other ones of the plurality of seating positions within the vehicle, and the real-time data related to biometric parameters for the passenger includes real-time data related to at least gender, height, and weight of the passenger, and position of the head and body of the passenger.

According to another aspect, the real-time data related to biometric parameters for the passenger includes real-time data related to physiological signals from the passenger.

According to another aspect, when predicting desired HVAC settings for the passenger located within the seating position based on the external factors for the seating position, the environmental factors for the seating position and the biometric parameters for the passenger, the system controller is further adapted to predict desired HVAC settings for different body portions of the passenger.

According to another aspect, the system controller is further adapted to continuously collect, from the plurality of onboard sensors, data related to a reaction, by the passenger, to current predicted desired HVAC settings, wherein the system controller is adapted to monitor, with a driver monitoring system and the plurality of onboard sensors, head movements and hand gestures by the passenger, receive, via a microphone, verbal feedback from the passenger, monitor, with the plurality of onboard sensors, changes in the external factors for the seating position and the biometric parameters for the passenger, and receive, via a human machine interface (HMI), manual adjustments, by the passenger, to the HVAC settings, and adjust the predicted desired HVAC settings based on the data related to the reaction by the passenger.

According to still another aspect, the system controller is further adapted to update the machine learning model for the seating position and the machine learning model for the passenger based on adjustments made to the predicted desired HVAC settings and the external factors for the seating position, the environmental factors for the seating position and the biometric parameters for the passenger when such adjustments are made.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
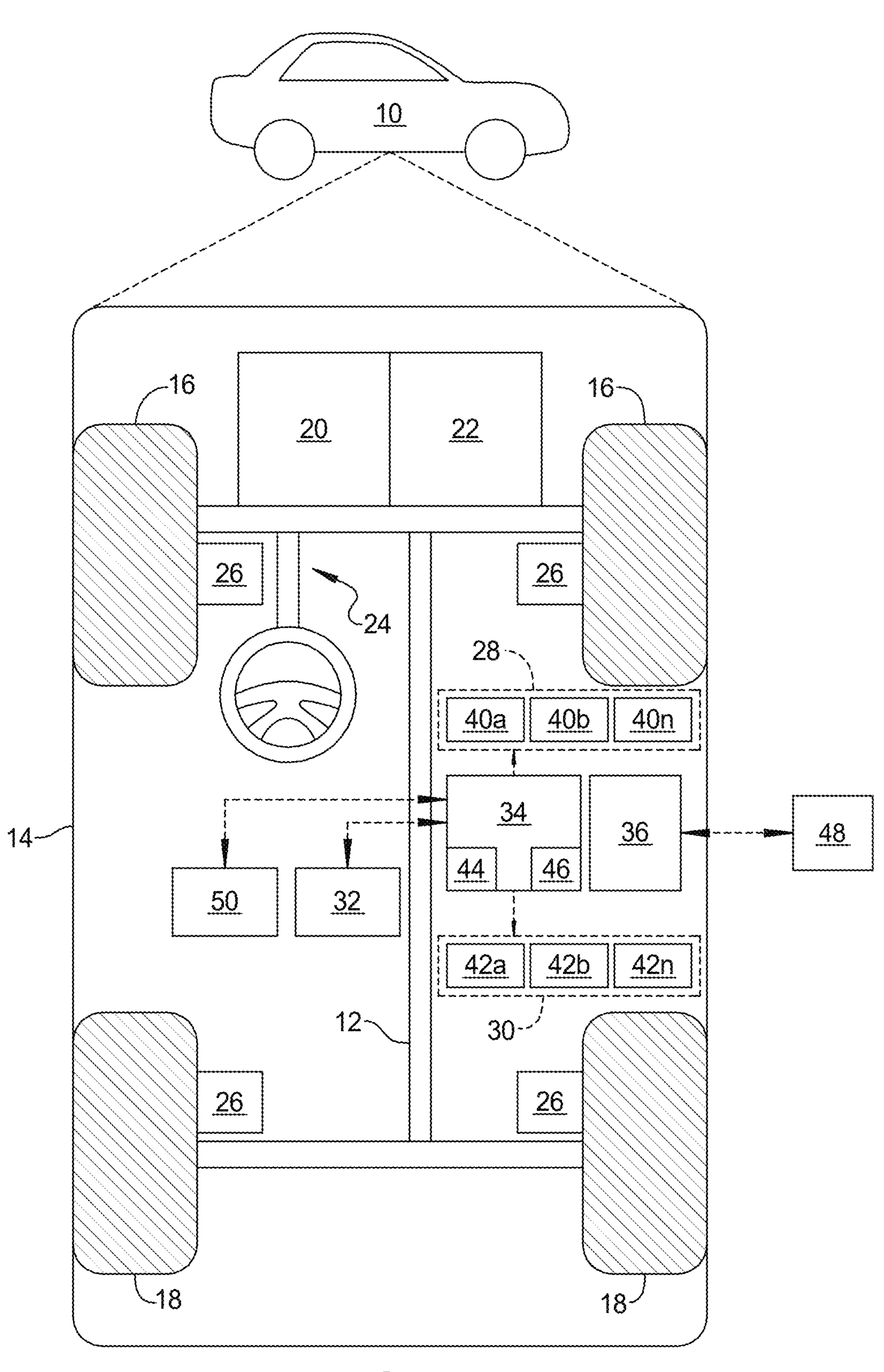
FIG. 1 is a schematic diagram of a vehicle having a system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 50 for automatically adjusting HVAC settings for a seating position to predicted desired HVAC settings for a passenger seated therein based on environmental factors, external factors, and biometric parameters. In general, the system 50 works in conjunction with other systems within the vehicle 10 to provide a personalized climate zone for each passenger within the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 50 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more onboard sensors 40*a*-40*n* that sense observable conditions of the exterior environment and/or the interior environment of the subject vehicle 10. The sensing devices 40*a*-40*n* can include, but are not limited to, radars, lidars, global positioning systems, optical cameras, thermal cameras, ultrasonic sensors, weight sensors and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40*a*-40*n* is used to determine information about an environment surrounding the vehicle 10. In an exemplary embodiment, the plurality of sensing devices 40*a*-40*n* includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40*a*-40*n* further includes sensors to determine information about the environment surrounding the vehicle 10, for example, an ambient air temperature sensor, a barometric pressure sensor, and/or a photo and/or video camera or cameras which are positioned to view the environment and conditions surrounding the vehicle 10.

In one example, at least one of the plurality of sensing devices 40*a*-40*n* is affixed inside of the vehicle 10, for example, in a headliner of the vehicle 10, having a view through the windshield of the vehicle 10. In another example, at least one of the plurality of sensing devices 40*a*-40*n* is affixed outside of the vehicle 10, for example, on a roof of the vehicle 10, having a view of the environment surrounding the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42*a*-42*n* that control one or more vehicle 10 features such as, but not limited to, the propulsion system 20, the transmission system 22, the steering system 24, and the brake system 26.

The system 50 includes a system controller 34A and an occupant monitoring system 56 that receives data from at least one camera included within the plurality of sensors 40*a*-40*n*. The occupant monitoring system 56 is adapted to detect movements of the head and eyes of passengers within the vehicle 10 to determine a direction which the passenger is looking and to what the passenger is looking at. The occupant monitoring system 56 is further adapted to monitor gestures made by the passengers using either head movements, such as nodding, or hand gestures.

The vehicle controller 34 and the system controller 34A each includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the system controller 34 in controlling the vehicle 10 and the system 50.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the subject vehicle 10, and generate control signals to the actuator system 30 to automatically control the components of the vehicle 10 based on the logic, calculations, methods, and/or algorithms. Although only one vehicle controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. The system controller 34A may be the vehicle controller 34, or the system controller 34A may be a separate controller in communication with the vehicle controller 34.

The wireless communication module 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The system controller 34A is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figures 2, 3:
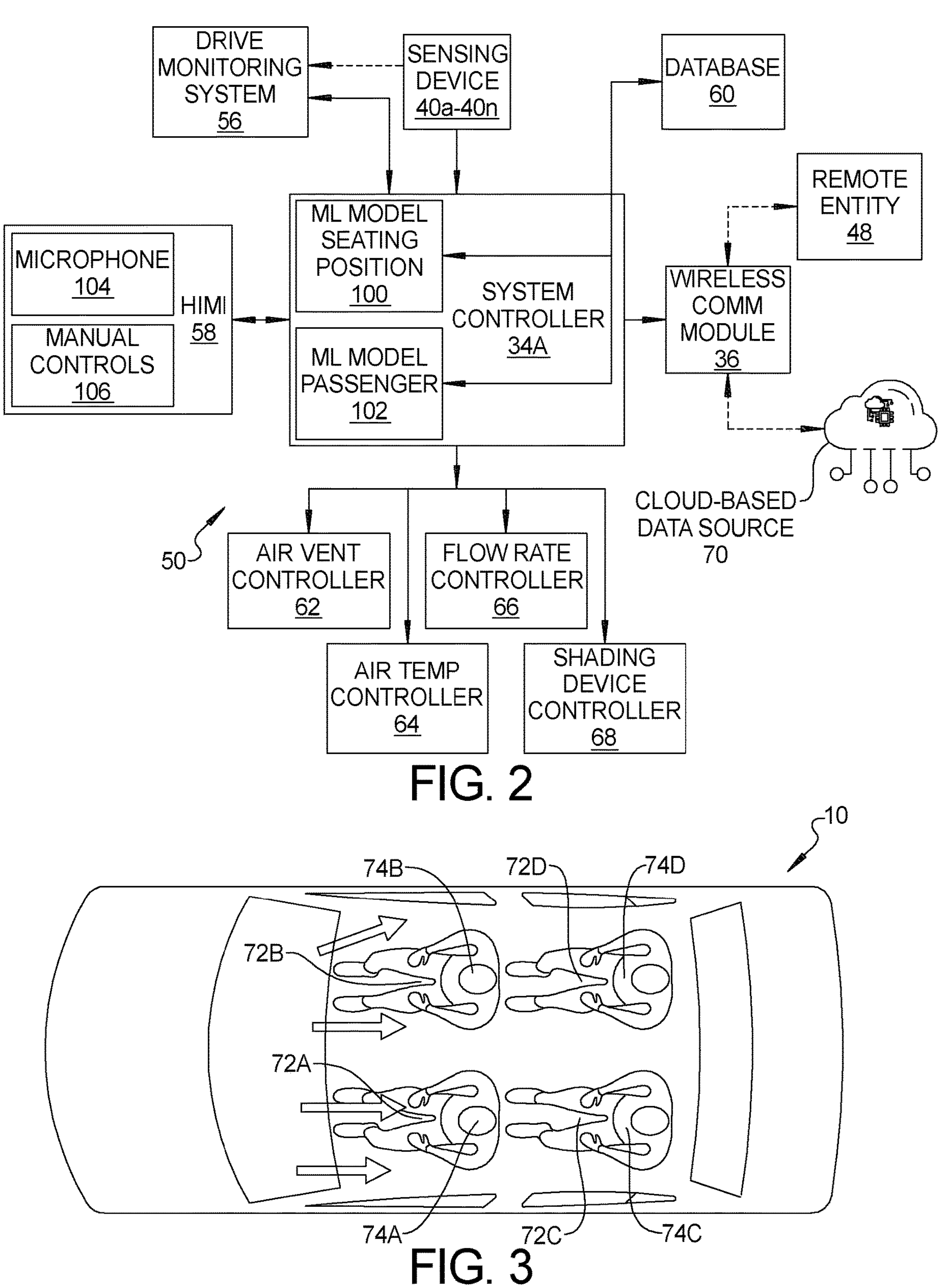
FIG. 2 is a schematic diagram of the system according to an exemplary embodiment.
FIG. 3 is a schematic top view of a passenger compartment of the vehicle shown in FIG. 1.

Referring to FIG. 2 a schematic diagram of the system 50 is shown. The system 50 includes the system controller 34A in communication with the plurality of sensing devices (onboard sensors) 40*a*-40*n*. In addition to the plurality of onboard sensors 40*a*-40*n*, the system controller 34A is in communication with the occupant monitoring system 56, a human machine interface (HMI) 58, a database 60, various HVAC components, including, but not limited to air vent controller 62, air temperature controller 64, flow rate controller 66 and shading device controller 68. The system controller 34A is further in communication with remote entities 48 and a remote cloud-based private data source 70 via the wireless communication module 36.

Figure 4:
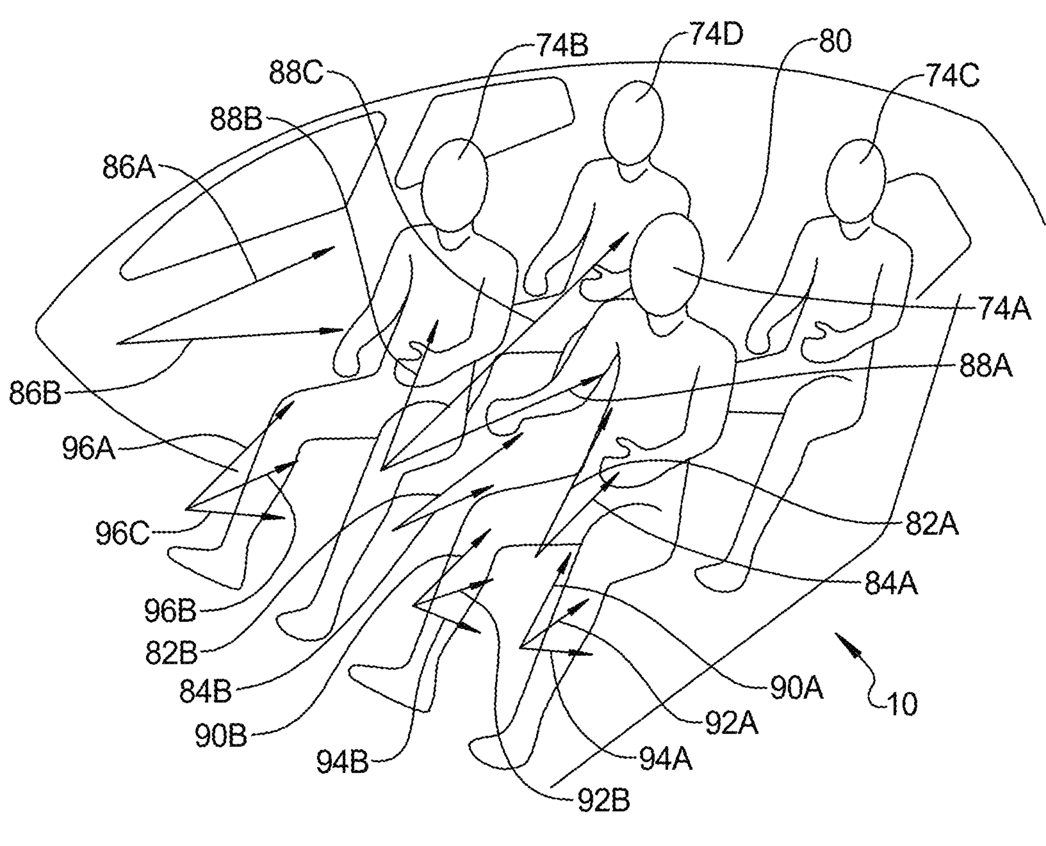
FIG. 4 is a schematic perspective view of the passenger compartment shown in FIG. 3.

Referring to FIG. 3 and FIG. 4, the system 50 is adapted to provide automatic individual control of heat, ventilation and air conditioning (HVAC) settings for each of a plurality of seating positions within the vehicle 10. As shown, the vehicle 10 includes four seating positions 72A, 72B, 720, 72D, each seating position 72A, 72B, 72C, 72D having a passenger 74A, 74B, 74C, 74D seated therein. It should be understood that the vehicle 10 may include any suitable number of seating positions therein, each one capable of having a passenger seated therein.

The HVAC system within the vehicle 10 includes the air vent controller 62 that is adapted to provide independent control of a plurality of vents 76 within the vehicle 10 that are adapted to direct air flow directionally within the vehicle 10. Each vent 76 within the vehicle 10 is independently controllable wherein the direction of air flow from the vent 76 may be adjusted, throttled, or shut off completely. Some vents 76 may be adapted to provide air flow only to a specific one of the seating positions 72A, 72B, 72C, 72D, and only to a specific body portion of a passenger 74A, 74B, 74C, 74D seated within that seating position. Other vents 76 may be adapted to selectively provide air flow to more than one passenger 74A, 74B, 74C, 74D and may be selectively adjusted to provide air flow to different body portions of the passenger.

Figure 5A:
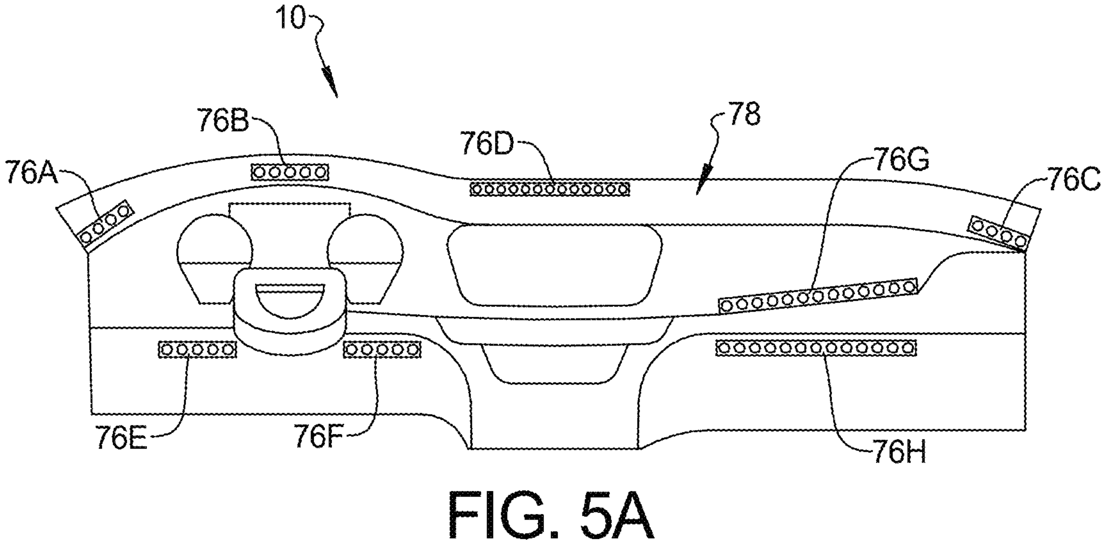
FIG. 5A is a schematic view of a console within the vehicle and vents located therein.

For example, referring to FIG. 5A, a front console 78 within the passenger compartment 80 of the vehicle 10 includes a first upper vent 76A and a second upper vent 76A that are each adapted to provide air flow specifically to the first passenger 74A (driver) seated within the first seating position 72A. The first and second upper vents 76A, 76B may be adjusted to direct air flow upward toward the face of the first passenger 74A, as indicated by arrows 82A, 82B in FIG. 4, or may be adjusted to direct air flow outward toward the chest/upper body of the first passenger 74A, as indicated by arrows 84A, 84B in FIG. 4. Similarly, the front console 78 of the vehicle 10 includes a third upper vent 76C that is adapted to provide air flow specifically to the second passenger 74B seated within the second seating position 72B. The third upper vent 76C may be adjusted to direct air flow upward toward the face of the second passenger 74B, as indicated by arrow 86A in FIG. 4, or may be adjusted to direct air flow outward toward the chest/upper body of the second passenger 74B, as indicated by arrow 86B in FIG. 4. A fourth upper vent 76D is positioned centrally on the front console 78 of the vehicle 10, wherein the fourth upper vent 76D may be adjusted to provide air flow toward the first passenger 74A, as indicated by arrow 88A in FIG. 4, or toward the second passenger 74B, as indicated by arrow 88B in FIG. 4. Further, the fourth upper vent 76D may be adjusted to provide air flow directed between the first and second passengers 74A, 74B toward the rear of the vehicle 10 for the third and/or fourth passengers 74C, 74D, as indicated by arrow 88C in FIG. 4.

Similarly, a first lower vent 76E and a second lower vent 76F are each adapted to provide air flow specifically to the first passenger 74A (driver) seated within the first seating position 72A. The first and second lower vents 76E, 76F may be adjusted to direct air flow upward toward the chest/upper body of the first passenger 74A, as indicated by arrows 90A and 90B in FIG. 4, may be adjusted to direct air flow laterally outward toward the lap of the first passenger 74A, as indicated by arrows 92A and 92B in FIG. 4, or may be adjusted to direct air flow downward toward the shins/feet of the first passenger 74A, as indicated by arrows 94A and 94B in FIG. 4. A third lower vent 76G and a fourth lower vent 76H are each adapted to provide air flow specifically to the second passenger 74B seated within the second seating position 72B. The third and fourth lower vents 76G, 76H may be adjusted to direct air flow upward toward the chest/upper body of the second passenger 74B, as indicated by arrow 96A in FIG. 4, may be adjusted to direct air flow laterally outward toward the lap of the second passenger 74B, as indicated by arrow 96B in FIG. 4, or may be adjusted to direct air flow downward toward the shins/feet of the second passenger 74B, as indicated by arrow 96C in FIG. 4.

Figure 5B:
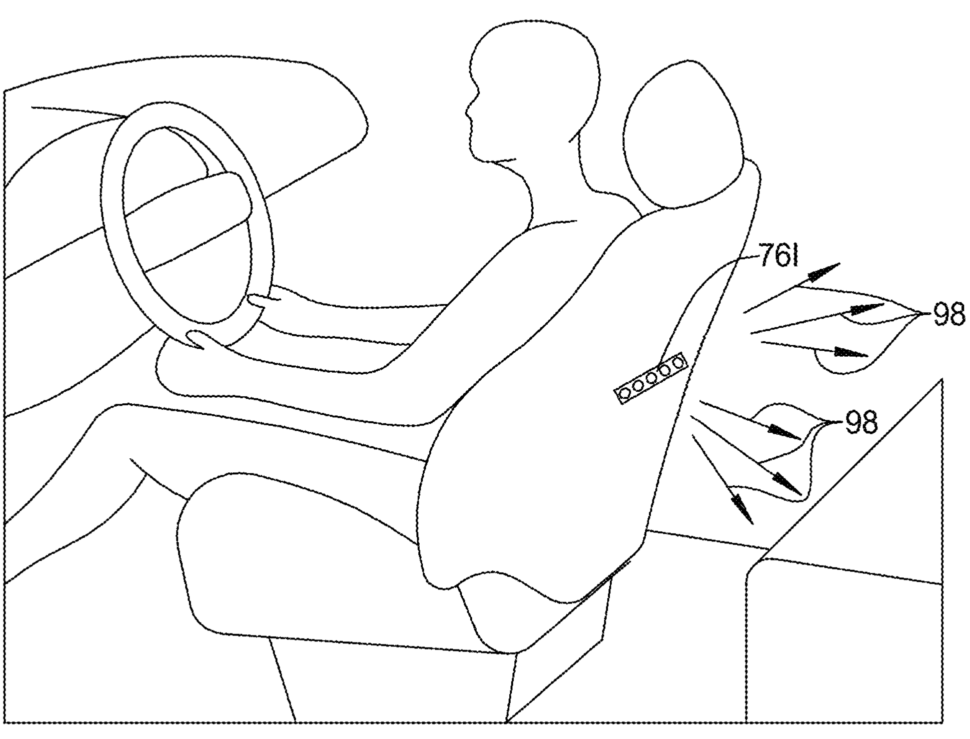
FIG. 5B is a schematic view illustrating vents positioned within a back surface of a seat within the vehicle.
Figure 5C:
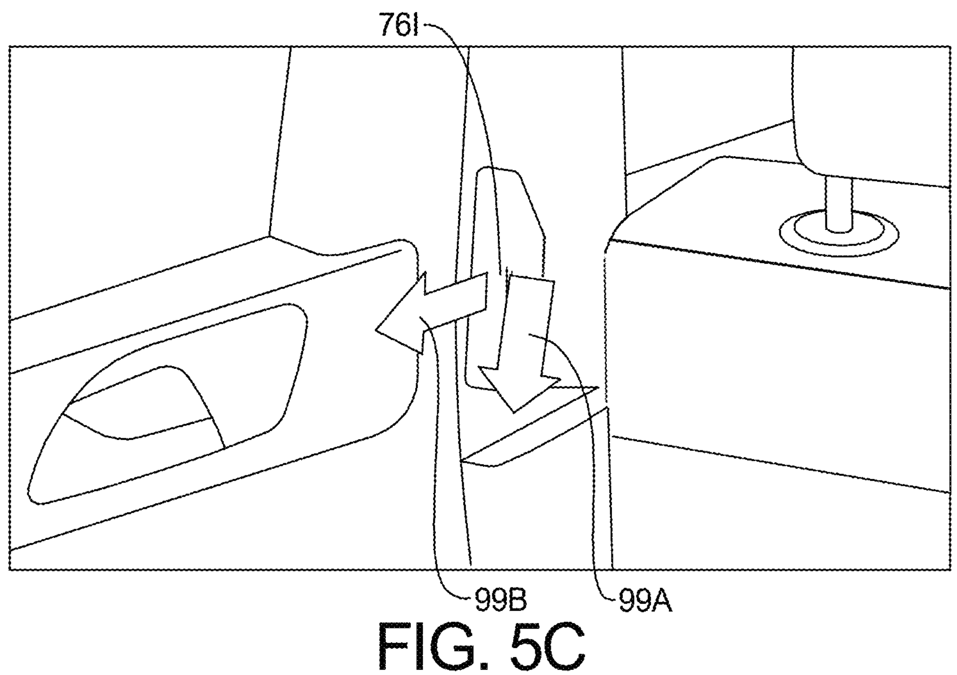
FIG. 5C is a schematic view of vents located within an interior side panel of the vehicle.

In another example, referring to FIG. 5B, a first back seat vent 76I is positioned within a back surface of a seatback of the first seating position 72A and adapted to direct air flow specifically to the third passenger 74C seated in the third seating position 72C directly behind the first seating position 72A, and to selectively direct air flow from the first back seat vent 76I upward, laterally outward, downward, or angled left or right, as indicated by arrows 98, to target specific body portions of the third passenger 74C. In another example, referring to FIG. 5C, a second back seat vent 76J is positioned within an interior side wall of the passenger compartment 80 to provide either air flow downward toward the feet of the third passenger 74C, as indicated by arrow 99A, or upward toward the face and/or body of the third passenger 74C, as indicated by arrow 99B.

In an exemplary embodiment, the vents 76A-76J are motorized vents including electro-mechanical motors adapted to selectively change the direction of air flow from the vent 76A-76J. The air vent controller 62 receives instructions from the system controller 34A and adjusts the direction of each of the vents 76A-76J independently.

The HVAC system within the vehicle 10 includes the air temperature controller 64 that is adapted to provide independent control of the temperature of air the flows to and through each of the plurality of vents 76A-76J within the vehicle 10. The air temperature controller 64 receives instructions from the system controller 34A and adjusts the temperature of the air that flows from each of the vents 76A-76J independently.

The HVAC system within the vehicle 10 includes the flow rate controller 66 that is adapted to provide independent control of the flow rate of air flowing from each of the vents 76A-76J. The flow rate controller 64 receives instructions from the system controller 34A and adjusts blowers and/or flow constrictors to control the mass flow rate of air flowing from each of the vents 76A-76J.

The HVAC system within the vehicle 10 includes the shading device controller 68 that is adapted to provide independent control of various shading devices such as visors and shades that partially or completely block solar light from entering the vehicle 10. The shading device controller 68 receives instructions from the system controller 34A and selectively and independently adjusts powered visors and shades within the vehicle 10 to block solar light from entering the vehicle 10 and affecting each of the seating positions 72A, 72B, 72C, 72D.

The system controller 34A, via communication with the plurality of onboard sensors 40*a*-40*n*, is adapted to detect if a passenger is present within each of the plurality of seating positions 72A-72D. The system controller 34A receives data from cameras of the occupant monitoring system 56 and from weight sensors included within the plurality of onboard sensors 40*a*-40*n* and positioned within each of the seating positions 72A-72D, and uses such data to determine, for each of the seating positions 72A-72D, if a passenger is seated therein.

For each of the seating positions 72A-72D where a passenger is detected, the plurality of onboard sensors 40*a*-40*n* is adapted to collect real-time data related to environmental factors for the seating position 72A-72D, external factors for the seating position 72A-72D, and biometric parameters for the passenger 74A-74D seated therein.

In an exemplary embodiment, the real-time data related to environmental factors for the seating position 72A-72D includes real-time data related to at least weather conditions, date (season), location, temperature, day/night, and solar loading. The system controller 34A receives data from the various onboard sensors 40*a*-40*n* that allow the system controller 34A to determine what the environmental conditions surrounding the vehicle 10 are, as well as receiving data from third party remote sources 48, such as weather stations, via the wireless communication module 36. The system controller 34A will use information related to the environmental conditions surrounding the vehicle 10 to help predict desired HVAC settings for each of the seating positions 72A-72B where a passenger 74A-74B is seated.

In an exemplary embodiment, the real-time data related to external factors for the seating position 72A-72D includes real-time data related to at least a type of clothing being worn by the passenger 74A-74D seated within a seating position 72A-72D, the number of other passengers 72A-72D within the vehicle 10 and predicted desired HVAC settings for other ones of the plurality of seating positions 72A-72D within the vehicle. The system controller 34A receives data from cameras included within the plurality of onboard sensing devices 40*a*-40*n*, object recognition algorithms and artificial intelligence algorithms to analyze images of the passengers 74A-74D within the vehicle 10 and identify clothing that the passengers 74A-74D are wearing to help predict desired HVAC settings for each of the seating positions 72A-72D where a passenger 74A-74D is seated. For example, for a first passenger 74A seated within the first seating position 72A, if the system controller 34A determines that the first passenger 74A is wearing heavy winter clothing and heavy boots, the system controller 34A will predict HVAC settings for the first seating position that provide less direct or cooler air flow for the first passenger 74A, even if environmental conditions are cold and/or raining/snowing. If the system controller 34A determines that the first passenger 74A is wearing light clothing, the system controller 34A will predict HVAC settings for the first seating position that provide more direct and/or warmer air flow for the first passenger 74A to keep the first passenger 74A comfortable given environmental conditions that are cold and/or raining/snowing.

Further, the number of other passengers 72A-72D within the vehicle 10 and predicted desired HVAC settings for other ones of the plurality of seating positions 72A-72D within the vehicle 10 will affect predictions of HVAC settings by the system controller 34A. For example, for a first passenger 74A seated within the first seating position 72A, if no other passengers are present, then the predicted HVAC settings for the first seating position 72A will be such that the vents 76A-76J adapted to provide air flow for the first seating position 72A will solely provide climate control for the first seating position 72A. However, if passengers 74A-74B are present within all of the seating positions 72A-72D, and the second, third and fourth passengers 74B, 74C, 74D have personal HVAC settings keeping their personal climate zone very warm, then the overall climate within the passenger compartment 80 of the vehicle 10 will be warmer, and thus, the system controller 34A, when predicting HVAC settings for the first seating position 72A, will take into consideration the effect of the HVAC settings at the other seating positions 72B, 72C, 72D.

In another exemplary embodiment, the real-time data related to biometric parameters for the passenger 74A-74D includes real-time data related to at least gender, height, and weight of the passenger 74A-74D, and position of the head and body of the passenger 74A-74D. The system controller 34A receives data from various ones of the plurality of onboard sensors 40*a*-40*n* to estimate characteristics such as gender, height, and weight of a passenger 74A-74D seated within a seating position 72A-72D and uses such data as a factor when predicting desired HVAC settings such as temperature for a passenger 74A-74D. Further, data from cameras of the occupant monitoring system 56 allow the system controller 34A to determine a position of the head and body of a passenger 74A-74D to predict HVAC settings such as directional orientation of the vents 76A-76J to ensure proper alignment of air flow from the vents 76A-76J to a passenger 74A-74D seated within a seating position 72A-72D, and/or to specific body portions of a passenger 74A-74D seated within a seating position 72A-72D.

In another exemplary embodiment, the real-time data related to biometric parameters for the passenger 74A-74D includes real-time data related to physiological signals from the passenger 74A-74D. The most accurate driver monitoring methods use physiological signals, such as brain waves and heart rate, pulse rate, body temperature and respiration rate signals. While electroencephalography (EEG), which monitors brain waves, provides the best physiological signal, such data is difficult to obtain while driving. Another biological signal is an electrocardiogram (ECG) signal with heart rate and heart rate variability information. Other methods of collecting physiological data include collecting biological signals such as respiration and body temperature (via sensors positioned within a seat and/or safety belt), gripping force and photoplethysmogram (PPG) (via sensors on the steering wheel), and muscle current (electromyography (EMG)). Such biological signals can also be received from wearable devices, such as a smartwatch, that are worn by the driver. Such data can be used by the system controller 34A when predicting desired HVAC settings for a passenger 74A-74D. For example, actual body temperature may be an indicator that a passenger 74A-74D is too hot or too cold, and other physiological indicators, such as respiration and heart rate may provide an indication of a passenger's 74A-74D overall comfort or level of stress, which can be a factor when predicting desired HVAC settings for that passenger 74A-74D.

The system controller 34A is adapted to, for each one of the plurality of seating positions 72A-72D where a passenger 74A-74D is detected, receive, from the plurality of onboard sensors 40*a*-40*n*, data related to the environmental factors and external factors for the seating position 72A-72D and biometric parameters for the passenger 74A-74D within the seating position 72A-72D and predict desired HVAC settings for the passenger 74A-74D located within the seating position 72A-72D based on the external factors for the seating position 72A-72D, the environmental factors for the seating position 72A-72D and the biometric parameters for the passenger 74A-74D, and, automatically adjust HVAC settings for the seating position 72A-72D to the predicted desired HVAC settings by adjusting direction of air flow from the plurality of vents 76A-76J with the air vent controller 62, adjust discharge air temperature from each of the vents 76A-76J with the air temperature controller 64, adjust discharge air mass flow rate through each of the vents 76A-76J with the flow rate controller 66, and actuate shading devices within the vehicle 10 with the shading device controller 68.

The database 60 is in communication with the system controller 34A and is adapted to store data related to past occasions of passengers riding at the plurality of seating positions 72A-72D within the vehicle 10, the environmental factors, external factors and biological factors recorded during such past occurrences and the HVAC settings that were accepted or manually selected by passengers during such previous occasions.

In an exemplary embodiment, when predicting desired HVAC settings for the passenger 74A-74D located within the seating position 72A-72D based on the external factors for the seating position 72A-72D, the environmental factors for the seating position 72A-72D and the biometric parameters for the passenger 74A-74D, the system controller 34A is further adapted to access a machine learning model 100 for the seating position 72A-72D based on data collected from past instances of occupants being seated within that seating position 72A-72D, and to access a machine learning model 102 for the passenger 74A-74D based on data collected from past instances of that passenger 74A-74D being seated within that seating position 72A-72D.

The machine learning model 100 for the seating position 72A-72D is a model based on past occurrences of all passengers who have rode within the vehicle 10 at that particular seating position 72A-72B, thus, each of the plurality of seating positions 72A-72D has a unique machine learning model 100. For example, the machine learning model 100 for the first seating position 72A will probabilistically predict desired HVAC settings for the first seating position 72A based on past occasions of passengers riding at the first seating position 72A, the environmental factors, external factors and biological factors recorded during such past occurrences and the HVAC settings that were accepted or manually selected by passengers during such previous occasions.

The machine learning model 102 for the passenger 74A-74D is a model based on past occurrences of a specific passenger riding within the vehicle 10, thus, each passenger that has rode within the vehicle 10 has a unique machine learning model 102. For example, the machine learning model 102 for the first passenger 74A will probabilistically predict desired HVAC settings for the first passenger 74A based on past occasions of the first passenger 74A riding within the vehicle 10 at the first seating position 72A, the environmental factors, external factors and biological factors recorded during such past occurrences and the HVAC settings that were accepted or manually selected by the first passenger 74A during such previous occasions.

The system controller 34A probabilistically predicts, with the machine learning model 100 for the seating position 72A-72D and the machine learning model 102 for the passenger 74A-74D, desired HVAC settings for the passenger 74A-74D within the seating position 72A-72D based on the real-time data related to environmental factors for the seating position 72A-72D, external factors for the seating position 72A-72D, and biometric parameters for the passenger 74A-74D.

Prediction of desired HVAC settings for a specific passenger 74A-74D seated within a specific seating position 72A-72D is based, at least in part, on a probabilistic calculation by the machine learning model 100 for the seating position 72A-72D and the machine learning model 102 for the passenger 74A-74D. For example, when the system controller 34A receives data related to the environmental factors, external factors and biological factors for a first passenger 74A seated at the first seating position 72A, the machine learning model 100 for the seating position 72A-72D and the machine learning model 102 for the passenger 74A-74D uses past data to probabilistically calculate desired HVAC settings for the specific passenger.

Various techniques are employed to extract meaningful features from sensor readings and data, including time-series analysis, frequency-domain analysis, and spatial-temporal patterns. The machine learning models 100, 102 may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN).

Thus, the system controller 34 uses the machine learning models 100, 102 and machine learning techniques to predict desired HVAC settings for an occupant based on analyzing the real-time data of the location of the vehicle 10, operating conditions of the vehicle 10, environmental factors, external factors and biological factors in light of data received from the database 60 including past occurrences of the system automatically adjusting the HVAC settings within the vehicle 10, the locations and operating conditions of the vehicle 10, environmental factors, external factors and biological factors when such prior occurrences took place in the past.

Occupants within a vehicle often engage in repeated patterns. Observation of such patterns allows the machine learning models 100, 102 to establish a pattern of behavior, and to predict future behavior based on such patterns. The machine learning model 100 for the seating position 72A-72D is based on past occurrences of various passengers being seated at the seating position 72A-72D and what HVAC settings were accepted or manually adjusted to by such passengers and the operating conditions, environmental factors, external factors and biological factors at that time. This allows the machine learning model 100 for the seating position 72A-72D to probabilistically calculate HVAC setting based on what has occurred in the past at that seating position 72A-72D. The machine learning model 102 for the passenger 74A-74D is based on past occurrences of that specific passenger being seated at the seating position 72A-72D and what HVAC settings were accepted or manually adjusted to by that specific passenger and the operating conditions, environmental factors, external factors and biological factors at that time. This allows the machine learning model 102 for the passenger to probabilistically calculate HVAC setting based on preferences for that specific passenger established during prior occurrences of that specific passenger riding in the vehicle 10.

To create the machine learning models 100, 102, first a generic machine learning model is trained with data collected from a plurality of different vehicles located in a region and climate similar to the vehicle 10. Each of the machine learning model 100 for the seating position and the machine learning model 102 for the passenger may be based on the same generic machine learning model as a starting point, or, alternatively, a unique generic machine learning model may be created as a starting point for each of the machine learning model 100 for the seating position and the machine learning model 102 for the passenger. A diverse dataset is collected from vehicles equipped with sensors such as GPS, accelerometers, cameras, radar, and LIDAR. The data encompasses various driving scenarios, including urban, highway, and off-road driving. Before feeding the data into machine learning models, preprocessing steps are undertaken to remove noise, handle missing values, and standardize features. An essential step in driving behavior classification is the extraction of relevant features from the raw data. As mentioned above, various techniques are employed to extract meaningful features from sensor readings, including time-series analysis, frequency-domain analysis, and spatial-temporal patterns. Different types of machine learning algorithms may be used for probabilistic identification of patterns, including but not limited to Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN). The generic machine learning model is trained on a labeled dataset and evaluated using various performance metrics such as accuracy, precision, recall, F1-score, and confusion matrix. The hyperparameters of the models are tuned to achieve optimal results. The generic machine learning model is trained on training data and will learn to map input features to the corresponding pattern (actions) probabilities.

The generic machine learning model (or models) is uploaded to the system controller 34A within the vehicle 10 from the cloud-based data source 70. The generic machine learning model provides a basis for creation of driver specific profiles and the machine learning model 102 for specific passengers that utilize the vehicle 10, and for creation of seating position specific profiles and the machine learning model 100 for specific seating positions 72A-72D within the vehicle 10. The upload of the generic machine learning model may be via a subscription-based service from a third-party provider or the vehicle 10 manufacturer. The machine learning models 100, 102 are ultimately created by updating the generic machine learning model. Once the generic machine learning model is uploaded, data is collected as passengers utilize the vehicle 10 day to day. During usage of the vehicle 10 and the system 50, the generic machine learning models 100, 102 are updated to customize the generic machine learning models 100, 102 to the specific passenger of the specific seating position, thus creating the machine learning models 100, 102, which are tailored for the specific passenger or the specific seating position of the vehicle 10 and are also continuously updated. The system controller 34A may have multiple machine learning models 100 for the seating position (one for each of the plurality of seating positions 72A-74D) and multiple machine learning models 102 for the passenger (one for each passenger that had utilized the system 50 within the vehicle 10) stored therein, each one tailored for a specific seating position or specific passenger. Any time a new passenger of the vehicle 10 is identified by the system controller 34A, via the occupant monitoring system 56, the system controller 34A will begin customizing a copy of the generic machine learning model, creating a unique machine learning model 102 for that passenger.

In an exemplary embodiment, when predicting desired HVAC settings for the passenger 74A-74D located within the seating position 72A-72D based on the external factors for the seating position, the environmental factors for the seating position and the biometric parameters for the passenger, the system controller 34A is further adapted to predict desired HVAC settings for different body portions of the passenger 74A-74D. For example, external factors established by collection of data indicate that the first passenger 74A seating within the first seating position 72A is wearing a heavy jacket and shorts. The environmental factors and the machine learning model 102 for the first passenger 74A indicate that the desired HVAC settings should provide heat for the first passenger 74A, however, based on the external factors, the system controller 34A determines that more heat should be provided for the feet and legs of the first passenger 74A and less heat should be provided for the upper body, due to the fact that the first passenger 74A is wearing a heavy jacket. Thus, the system controller 34A will predict desired HVAC settings that take this into consideration. In another example, biological factors may provide data that a temperature of the first passenger's 74A legs and feet is lower than a temperature of the first passenger's 74A upper body, wherein, the system controller 34A determines that more heat should be provided for the feet and legs of the first passenger 74A and less heat should be provided for the upper body. Adjustments by the system controller 34A to the desired HVAC settings may include any one of adjusting the mass flow volume of air provided to the feet and legs compared to the mass flow volume of air provided to the upper body of the first passenger 74A, increasing the temperature of the air that is blowing onto the feet and legs of the first passenger 74A, and directing vents to aim air flow more directly onto the feet and legs of the first passenger 74A.

In another exemplary embodiment, the system controller 34A is adapted to continuously collect, from the plurality of onboard sensors 40*a*-40*n*, data related to a reaction, by the passenger 74A-74D, to current predicted desired HVAC settings. The system controller 34A monitors, with the occupant monitoring system 56 and the plurality of onboard sensors 40*a*-40*n*, head movements and hand gestures by the passenger 74A-74D, and receives, via a microphone 104 associated with the HMI 58, verbal feedback from the passenger 74A-74D. The system controller 34A further monitors, with the plurality of onboard sensors 40*a*-40*n*, changes in the external factors for the seating position 72A-72D and the biometric parameters for the passenger 74A-74D. Finally, the system controller 34A receives, via the human machine interface (HMI) 58, notification when manual adjustments are made by the passenger 74A-74D, to the HVAC settings.

The HMI 58 includes a touch screen display screen on which information is displayed for passengers 74A-74D, and wherein the passengers 74A-74D are capable of interacting with the system 50 via interaction with the touch screen and/or through verbal inputs picked up by the microphone 104 associated with the HMI 58. In an exemplary embodiment, the HMI 58 is associated with a head-up-display within the vehicle 10 and in communication with the system controller 34A, wherein the system controller 34A can utilize the head-up-display to display information related to current desired HVAC settings onto an inner surface of a windshield of the vehicle 10 in addition to displaying information on the HMI 58.

If the system controller 34A determines, based on the reaction by the passenger 74A-74D that the passenger 74A-74D is not happy with the current desired HVAC settings, the system controller 34A is adapted to adjust the predicted desired HVAC settings based on the data related to the reaction by the passenger 74A-74D. For example, the third passenger 74C may become uncomfortably warm due to direct sunlight coming into a side window next to the third passenger 74C. The third passenger 74C may comment "I am hot", which is picked up by the microphone 104, wherein the system controller, using speech recognition algorithms, determines that adjustments to the desired HVAC settings for the third seating position 72C are necessary. Such adjustments may include adjusting the temperature of air (providing cool air) blowing on the third passenger 74C, or actuating, via the shading device controller 68, a window shade to partially or completely block sunlight entering the side window. Alternatively, the second passenger 74B seated at the second seating position 72B manually adjusts the HVAC setting for the second seating position 72B, using manual controls 106 associated with the HMI 58. The system controller 34A, in response to such manual adjustment, may alter the desired HVAC settings for the second seating position 72B further, and may alter the desired HVAC settings for the first, third and fourth seating positions 72A, 72C, 72D.

When adjustments are made to the calculated desired HVAC settings for a passenger 74A-74D, the system controller 34A is further adapted to update the machine learning model 100 for the seating position 72A-72D and the machine learning model 102 for the passenger 74A-74D based on adjustments made to the predicted desired HVAC settings and the external factors for the seating position, the environmental factors for the seating position and the biometric parameters for the passenger when such adjustments are made. Thus, referring to the example above, when the system controller 34A makes adjustments based on the third passenger 74C saying "I am hot", the system controller 34A will update the machine learning model 102 for the third passenger 74C to more accurately calculate desired HVAC setting for the third passenger 74C in the future. Further, when the second passenger 74B manually adjusts the HVAC settings, the system controller will update the machine learning model 102 for the second passenger 74B to more accurately calculate desired HVAC settings for the second passenger 74B in the future.

In an exemplary embodiment, when analyzing the response (feedback) of the passenger 74A-74D, the system controller 34A is adapted to probabilistically calculate a likelihood that the passenger 74A-74D is not content, and further, a likelihood that adjustments should be made to the current desired HVAC settings. Using environmental factors, external factors, biological factors and the machine learning models 100, 102, the system controller 34A probabilistically calculates a likelihood that the passenger desires an adjustment to the current desired HVAC settings. Thus, in any given situation, the system controller 34A weighs the response feedback in light of all other conditions, for example, calculating a 10% likelihood that an adjustment should be made, which does not exceed a pre-determined threshold of, by way of non-limiting example, 25%, and thus, no adjustment is made. If the system controller 34A calculates a probabilistic likelihood that exceeds the pre-determined threshold, then the system controller 34A will proceed with re-calculating the desired HVAC settings and making adjustments accordingly.

Figure 6:
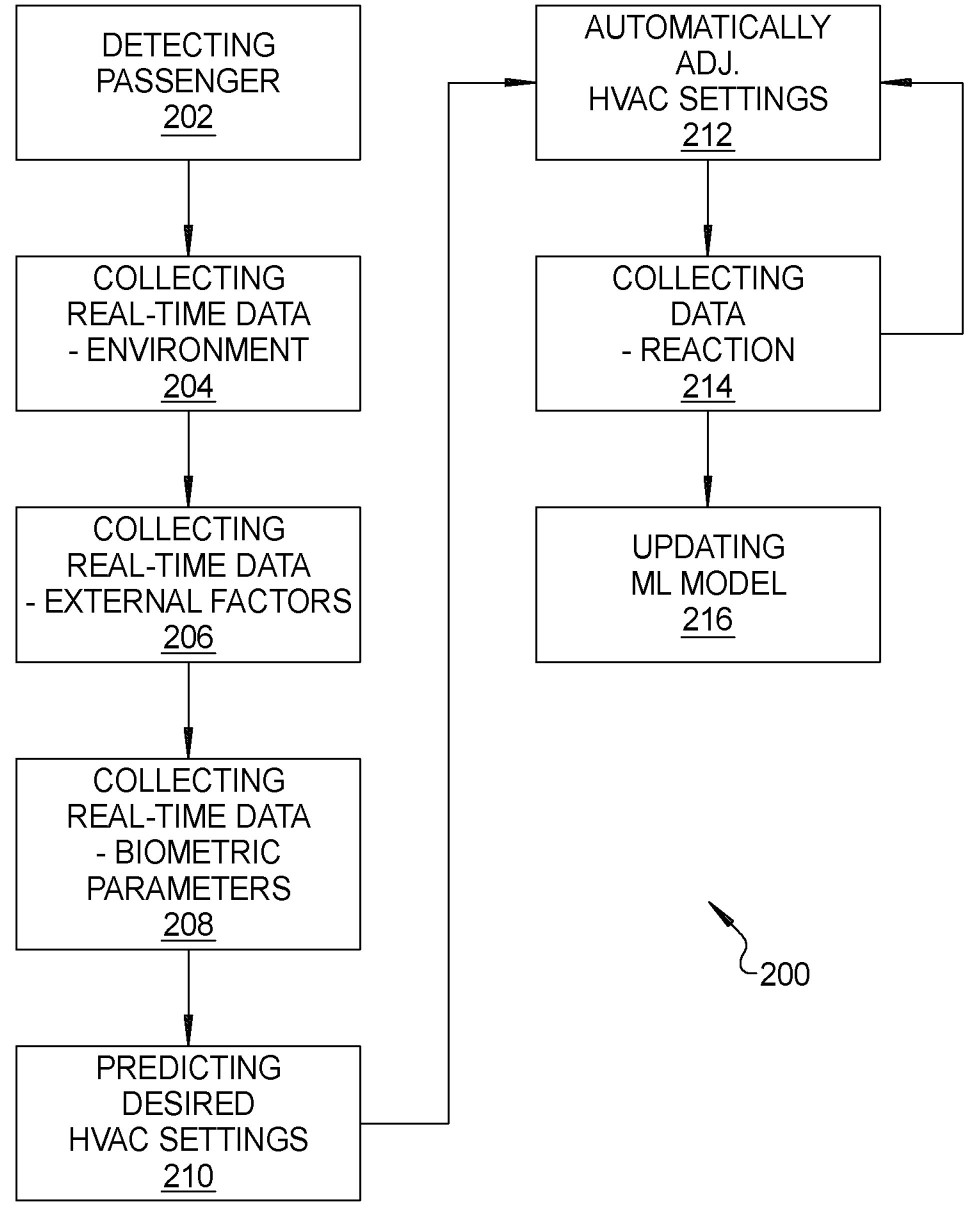
FIG. 6 is a flow chart illustrating a method according to an exemplary embodiment.

Referring to FIG. 6, a method 200 of individually controlling heat, ventilation and air conditioning (HVAC) settings for each of a plurality of seating positions 72A-72D within a vehicle 10, includes, for each one of the plurality of seating positions 72A-72D, beginning at block 202, detecting, with a plurality of onboard sensors 40*a*-40*n* within the vehicle 10 and in communication with a system controller 34A, a presence of a passenger 74A-74D within the seating position 72A-72D, moving to block 204, collecting, with the plurality of onboard sensors 40*a*-40*n* in communication with the system controller 34A, real-time data related to environmental factors for the seating position 72A-72D, moving to block 206, collecting, with the plurality of onboard sensors 40*a*-40*n*, real-time data related to external factors for the seating position 72A-72D, moving to block 208, collecting, with the plurality of onboard sensors 40*a*-40*n*, real-time data related to biometric parameters for the passenger 74A-74D, moving to block 210, predicting, with the system controller 34A, desired HVAC settings for the passenger 74A-74D located within the seating position 72A-72D based on the external factors for the seating position 72A-72D, the environmental factors for the seating position 72A-72D and the biometric parameters for the passenger 74A-74D, and, moving to block 212, automatically, with the system controller 34A, adjusting HVAC settings for the seating position 72A-72D to the predicted desired HVAC settings.

In another exemplary embodiment, the predicting, with the system controller 34A, desired HVAC settings for the passenger 74A-74D located within the seating position 72A-72D based on the external factors for the seating position 72A-72D, the environmental factors for the seating position 72A-72D and the biometric parameters for the passenger 74A-74D at block 210 further includes accessing, with the system controller 34A, a machine learning model 100 for the seating position 72A-72D based on data collected from past instances of occupants being seated within the seating position 72A-72D, and probabilistically predicting, with the machine learning model 100 for the seating position 72A-72D, desired HVAC settings for the passenger 74A-74D within the seating position 72A-72D based on the real-time data related to environmental factors for the seating position 72A-72D, external factors for the seating position 72A-72D, and biometric parameters for the passenger 74A-74D.

In another exemplary embodiment, the predicting, with the system controller 34A, desired HVAC settings for the passenger 74A-74D located within the seating position 72A-72D based on the external factors for the seating position 72A-72D, the environmental factors for the seating position 72A-72D and the biometric parameters for the passenger 74A-74D at block 210 further includes accessing, with the system controller 34A, a machine learning model 102 for the passenger 74A-74D based on data collected from past instances of the passenger 74A-74D being seated within the seating position 72A-72D, and probabilistically predicting, with the machine learning model 102 for the passenger 74A-74D, desired HVAC settings for the passenger 74A-74D within the seating position 72A-72D based on the real-time data related to environmental factors for the seating position 72A-72D, external factors for the seating position 72A-72D, and biometric parameters for the passenger 74A-74D.

In another exemplary embodiment, the collecting, with the plurality of onboard sensors 40*a*-40*n* in communication with the system controller 34A, real-time data related to environmental factors for the seating position 72A-72D at block 204 includes collecting, with the plurality of onboard sensors 40*a*-40*n*, real-time data related to at least weather conditions, date (season), location, temperature, day/night, and solar loading.

In another exemplary embodiment, the collecting, with the plurality of onboard sensors 40*a*-40*n*, real-time data related to external factors for the seating position 72A-72D at block 206 includes collecting, with the plurality of onboard sensors 40*a*-40*n*, real-time data related to at least a type of clothing being worn by the passenger 74A-74D, number of other passengers within the vehicle 10 and predicted desired HVAC settings for other ones of the plurality of seating positions 72A-72D within the vehicle 10.

In another exemplary embodiment, the collecting, with the plurality of onboard sensors 40*a*-40*n*, real-time data related to biometric parameters for the passenger 74A-74D at block 208 includes collecting, with the plurality of onboard sensors 40*a*-40*n*, real-time data related to at least gender, height, and weight of the passenger 74A-74D, and position of the head and body of the passenger 74A-74D.

In another exemplary embodiment, the collecting, with the plurality of onboard sensors 40*a*-40*n*, real-time data related to biometric parameters for the passenger 74A-74D at block 208 includes collecting, with the plurality of onboard sensors 40*a*-40*n*, real-time data related to physiological signals from the passenger 74A-74D.

In another exemplary embodiment, the predicting, with the system controller 34A, desired HVAC settings for the passenger 74A-74D located within the seating position 72A-72D based on the external factors for the seating position 72A-72D, the environmental factors for the seating position 72A-72D and the biometric parameters for the passenger 74A-74D at block 210 includes predicting desired HVAC settings for different body portions of the passenger 74A-74D.

In another exemplary embodiment, the automatically, with the system controller 34A, adjusting HVAC settings for the seating position 72A-72D to the predicted desired HVAC settings at block 212 includes at least adjusting direction of vents, adjusting discharge air temperature, adjusting discharge air mass flow rate, and actuating shading devices.

In another exemplary embodiment, the method 200 further includes, moving to block 214, continuously collecting, with the plurality of onboard sensors 40*a*-40*n*, data related to a reaction, by the passenger 74A-74D, to current predicted desired HVAC settings, and, moving back to block 212, automatically adjusting the predicted desired HVAC settings based on the data related to the reaction by the passenger 74A-74D.

In another exemplary embodiment, the method 200 further includes, moving to block 216, updating the machine learning model 100 for the seating position 72A-72D and the machine learning model 102 for the passenger 74A-74D based on adjustments made to the predicted desired HVAC settings and the external factors for the seating position 72A-72D, the environmental factors for the seating position 72A-72D and the biometric parameters for the passenger 74A-74D when such adjustments are made.

In yet another exemplary embodiment, the continuously collecting, with the plurality of onboard sensors 40*a*-40*n*, data related to a reaction, by the passenger 74A-74D, to current predicted desired HVAC settings at block 214, includes monitoring, with a driver monitoring system 56 and the plurality of onboard sensors 40*a*-40*n*, head movements and hand gestures by the passenger 74A-74D, receiving, via a microphone 104, verbal feedback from the passenger 74A-74D, monitoring, with the plurality of onboard sensors 40*a*-40*n*, changes in the external factors for the seating position 72A-72D and the biometric parameters for the passenger 74A-74D, and receiving, via a human machine interface (HMI) 58, manual adjustments, by the passenger 74A-74D, to the HVAC settings.

A system 50 and method 100 of the present disclosure offers the advantage of automatically controlling HVAC settings within a vehicle to provide a customized micro-climate zone for each passenger within the vehicle that is tailored to the passenger's personal preferences, and automatically updating HVAC settings when changes are detected.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of individually controlling heat, ventilation and air conditioning (HVAC) settings for each of a plurality of seating positions within a vehicle, comprising, for each one of the plurality of seating positions:

detecting, with a plurality of onboard sensors within the vehicle and in communication with a system controller, a presence of a passenger within the seating position;

collecting, with a plurality of onboard sensors in communication with a system controller, real-time data related to environmental factors for the seating position;

collecting, with the plurality of onboard sensors, real-time data related to external factors for the seating position;

collecting, with the plurality of onboard sensors, real-time data related to biometric parameters for the passenger;

predicting, with the system controller, desired HVAC settings for the passenger located within the seating position based on the external factors for the seating position, the environmental factors for the seating position and the biometric parameters for the passenger, including:

accessing, with the system controller, a machine learning model for the seating position;

accessing, with the system controller, a machine learning model for the passenger; and probabilistically predicting, with the machine learning model for the seating position and with the machine learning model for the passenger, desired HVAC settings; and automatically, with the system controller, adjusting HVAC settings for the seating position to the predicted desired HVAC settings.

2. The method of claim 1 wherein the accessing, with the system controller, the machine learning model for the seating position and probabilistically predicting, with the machine learning model for the seating position, desired HVAC settings further includes:

accessing, with the system controller, the machine learning model for the seating position based on data collected from past instances of occupants being seated within the seating position; and probabilistically predicting, with the machine learning model for the seating position, desired HVAC settings for the passenger within the seating position based on the real-time data related to environmental factors for the seating position, external factors for the seating position, and biometric parameters for the passenger.

3. The method of claim 1 wherein the accessing, with the system controller, a machine learning model for the passenger and probabilistically predicting, with the machine learning model for the passenger, desired HVAC settings further includes:

accessing, with the system controller, the machine learning model for the passenger based on data collected from past instances of the passenger being seated within the seating position; and probabilistically predicting, with the machine learning model for the passenger, desired HVAC settings for the passenger within the seating position based on the real-time data related to environmental factors for the seating position, external factors for the seating position, and biometric parameters for the passenger.

4. The method of claim 1, wherein the collecting, with the plurality of onboard sensors in communication with the system controller, real-time data related to environmental factors for the seating position includes collecting, with the plurality of onboard sensors, real-time data related to at least weather conditions, date (season), location, temperature, day/night, and solar loading.

5. The method of claim 1, wherein the collecting, with the plurality of onboard sensors, real-time data related to external factors for the seating position includes collecting, with the plurality of onboard sensors, real-time data related to at least a type of clothing being worn by the passenger, number of other passengers within the vehicle and predicted desired HVAC settings for other ones of the plurality of seating positions within the vehicle.

6. The method of claim 1, wherein the collecting, with the plurality of onboard sensors, real-time data related to biometric parameters for the passenger includes collecting, with the plurality of onboard sensors, real-time data related to at least gender, height, and weight of the passenger, and position of the head and body of the passenger.

7. The method of claim 6, wherein the collecting, with the plurality of onboard sensors, real-time data related to biometric parameters for the passenger includes collecting, with the plurality of onboard sensors, real-time data related to physiological signals from the passenger.

8. The method of claim 1, wherein the predicting, with the system controller, desired HVAC settings for the passenger located within the seating position based on the external factors for the seating position, the environmental factors for the seating position and the biometric parameters for the passenger includes predicting desired HVAC settings for different body portions of the passenger.

9. The method of claim 1, wherein the automatically, with the system controller, adjusting HVAC settings for the seating position to the predicted desired HVAC settings includes at least adjusting direction of vents, adjusting discharge air temperature, adjusting discharge air mass flow rate, and actuating shading devices.

10. The method of claim 1, further including:

continuously collecting, with the plurality of onboard sensors, data related to a reaction, by the passenger, to current predicted desired HVAC settings; and automatically adjusting the predicted desired HVAC settings based on the data related to the reaction by the passenger.

11. The method of claim 10, further including updating the machine learning model for the seating position and the machine learning model for the passenger based on adjustments made to the predicted desired HVAC settings and the external factors for the seating position, the environmental factors for the seating position and the biometric parameters for the passenger when such adjustments are made.

12. The method of claim 10, wherein the continuously collecting, with the plurality of onboard sensors, data related to a reaction, by the passenger, to current predicted desired HVAC settings includes:

monitoring, with a driver monitoring system and the plurality of onboard sensors, head movements and hand gestures by the passenger;

receiving, via a microphone, verbal feedback from the passenger;

monitoring, with the plurality of onboard sensors, changes in the external factors for the seating position and the biometric parameters for the passenger; and receiving, via a human machine interface (HMI), manual adjustments, by the passenger, to the HVAC settings.

13. A system for individually controlling heat, ventilation and air conditioning (HVAC) settings for each of a plurality of seating positions within a vehicle, comprising:

a system controller in communication with a plurality of onboard sensors within the vehicle;

the plurality of onboard sensors adapted to:

detect a presence of a passenger within a one of the plurality of seating positions;

collect real-time data related to environmental factors for the seating position;

collect real-time data related to external factors for the seating position; and collect real-time data related to biometric parameters for the passenger;

the system controller adapted to, for each one of the plurality of seating positions where a passenger is detected:

receive, from the plurality of sensors, data related to the detection of a passenger within the seating position, environmental factors and external factors for the seating position and biometric parameters for the passenger within the seating position;

predict desired HVAC settings for the passenger located within the seating position based on the external factors for the seating position, the environmental factors for the seating position and the biometric parameters for the passenger, including;

access, with the system controller, a machine learning model for the seating position;

access, with the system controller, a machine learning model for the passenger; and probabilistically predict, with the machine learning model for the seating position and with the machine learning model for the passenger, desired HVAC settings; and automatically adjust HVAC settings for the seating position to the predicted desired HVAC settings, wherein, the system controller is adapted to at least adjust direction of vents, adjust discharge air temperature, adjust discharge air mass flow rate, and actuate shading devices.

14. The system of claim 13 wherein, when predicting desired HVAC settings for the passenger located within the seating position based on the external factors for the seating position, the environmental factors for the seating position and the biometric parameters for the passenger, the system controller is further adapted to:

access the machine learning model for the seating position based on data collected from past instances of occupants being seated within the seating position;

access the machine learning model for the passenger based on data collected from past instances of the passenger being seated within the seating position; and probabilistically predict, with the machine learning model for the seating position and the machine learning model for the passenger, desired HVAC settings for the passenger within the seating position based on the real-time data related to environmental factors for the seating position, external factors for the seating position, and biometric parameters for the passenger.

15. The system of claim 13, wherein:

the real-time data related to environmental factors for the seating position includes real-time data related to at least weather conditions, date (season), location, temperature, day/night, and solar loading;

the real-time data related to external factors for the seating position includes real-time data related to at least a type of clothing being worn by the passenger, number of other passengers within the vehicle and predicted desired HVAC settings for other ones of the plurality of seating positions within the vehicle; and the real-time data related to biometric parameters for the passenger includes real-time data related to at least gender, height, and weight of the passenger, and position of the head and body of the passenger.

16. The system of claim 15, wherein the real-time data related to biometric parameters for the passenger includes real-time data related to physiological signals from the passenger.

17. The system of claim 13, wherein, when predicting desired HVAC settings for the passenger located within the seating position based on the external factors for the seating position, the environmental factors for the seating position and the biometric parameters for the passenger, the system controller is further adapted to predict desired HVAC settings for different body portions of the passenger.

18. The system of claim 13, wherein the system controller is further adapted to:

continuously collect, from the plurality of onboard sensors, data related to a reaction, by the passenger, to current predicted desired HVAC settings, wherein the system controller is adapted to:

monitor, with a driver monitoring system and the plurality of onboard sensors, head movements and hand gestures by the passenger;

receive, via a microphone, verbal feedback from the passenger;

monitor, with the plurality of onboard sensors, changes in the external factors for the seating position and the biometric parameters for the passenger; and receive, via a human machine interface (HMI), manual adjustments, by the passenger, to the HVAC settings; and adjust the predicted desired HVAC settings based on the data related to the reaction by the passenger.

19. The system of claim 18, wherein the system controller is further adapted to update the machine learning model for the seating position and the machine learning model for the passenger based on adjustments made to the predicted desired HVAC settings and the external factors for the seating position, the environmental factors for the seating position and the biometric parameters for the passenger when such adjustments are made.

20. A vehicle having a system for individually controlling heat, ventilation and air conditioning (HVAC) settings for each of a plurality of seating positions within a vehicle, the system comprising:

a system controller in communication with a plurality of onboard sensors within the vehicle;

the plurality of onboard sensors adapted to:

detect a presence of a passenger within a one of the plurality of seating positions;

collect real-time data related to environmental factors for the seating position including real-time data related to at least weather conditions, date (season), location, temperature, day/night, and solar loading;

collect real-time data related to external factors for the seating position including real-time data related to at least a type of clothing being worn by the passenger, number of other passengers within the vehicle and predicted desired HVAC settings for other ones of the plurality of seating positions within the vehicle; and collect real-time data related to biometric parameters for the passenger including real-time data related to at least gender, height, and weight of the passenger, and position of the head and body of the passenger;

the system controller adapted to, for each one of the plurality of seating positions where a passenger is detected:

receive, from the plurality of sensors, data related to the detection of a passenger within the seating position, environmental factors and external factors for the seating position and biometric parameters for the passenger within the seating position;

access a machine learning model for the seating position based on data collected from past instances of occupants being seated within the seating position;

access a machine learning model for the passenger based on data collected from past instances of the passenger being seated within the seating position; and probabilistically predict, with the machine learning model for the seating position and the machine learning model for the passenger, desired HVAC settings for the passenger within the seating position based on the real-time data related to environmental factors for the seating position, external factors for the seating position, and biometric parameters for the passenger;

automatically adjust HVAC settings for the seating position to the predicted desired HVAC settings, wherein, the system controller is adapted to at least adjust direction of vents, adjust discharge air temperature, adjust discharge air mass flow rate, and actuate shading devices;

continuously collect, from the plurality of onboard sensors, data related to a reaction, by the passenger, to current predicted desired HVAC settings, wherein the system controller is adapted to:

monitor, with a driver monitoring system and the plurality of onboard sensors, head movements and hand gestures by the passenger;

receive, via a microphone, verbal feedback from the passenger;

monitor, with the plurality of onboard sensors, changes in the external factors for the seating position and the biometric parameters for the passenger; and receive, via a human machine interface (HMI), manual adjustments, by the passenger, to the HVAC settings;

adjust the predicted desired HVAC settings based on the data related to the reaction by the passenger; and update the machine learning model for the seating position and the machine learning model for the passenger based on adjustments made to the predicted desired HVAC settings and the external factors for the seating position, the environmental factors for the seating position and the biometric parameters for the passenger when such adjustments are made.

* * * * *